United States Patent
Niehsen et al.

(10) Patent No.: US 8,948,903 B2
(45) Date of Patent: Feb. 3, 2015

(54) MACHINE TOOL DEVICE HAVING A COMPUTING UNIT ADAPTED TO DISTINGUISH AT LEAST TWO MOTIONS

(75) Inventors: Wolfgang Niehsen, Bad Salzdetfurth (DE); Jochen Wingbermuehle, Hemmingen (DE); Matthias Heiler, Zurich (CH)

(73) Assignee: Robert Bosch GmbH, Stuttgart (DE)

( * ) Notice: Subject to any disclaimer, the term of this patent is extended or adjusted under 35 U.S.C. 154(b) by 1057 days.

(21) Appl. No.: 12/747,862

(22) PCT Filed: Oct. 30, 2008

(86) PCT No.: PCT/EP2008/064738
§ 371 (c)(1),
(2), (4) Date: Apr. 5, 2011

(87) PCT Pub. No.: WO2009/083297
PCT Pub. Date: Jul. 9, 2009

(65) Prior Publication Data
US 2011/0167970 A1 Jul. 14, 2011

(30) Foreign Application Priority Data
Dec. 21, 2007 (DE) .............................. 102007062996

(51) Int. Cl.
*F16P 3/14* (2006.01)
*B27G 19/00* (2006.01)
*G01P 3/36* (2006.01)
*G06T 7/20* (2006.01)

(52) U.S. Cl.
CPC ... *F16P 3/14* (2013.01); *G01P 3/36* (2013.01); *G06T 7/20* (2013.01); *G06T 2207/10016* (2013.01)
USPC .............................................. 700/177; 83/61

(58) Field of Classification Search
None
See application file for complete search history.

(56) References Cited

U.S. PATENT DOCUMENTS

| 5,761,070 | A | * | 6/1998 | Conners et al. | 700/223 |
| 5,825,917 | A | * | 10/1998 | Suzuki | 382/164 |
| 6,008,800 | A | * | 12/1999 | Pryor | 345/173 |
| 6,370,196 | B1 | * | 4/2002 | Griessl et al. | 375/240.16 |
| 6,480,615 | B1 | * | 11/2002 | Sun et al. | 382/103 |
| 7,062,071 | B2 | * | 6/2006 | Tsujino et al. | 382/103 |
| 7,095,401 | B2 | * | 8/2006 | Liu et al. | 345/156 |
| 7,173,537 | B2 | * | 2/2007 | Voigtlaender | 340/585 |
| 7,221,779 | B2 | * | 5/2007 | Kawakami et al. | 382/107 |

(Continued)

FOREIGN PATENT DOCUMENTS

| DE | 10 2004 018 813 | 2/2006 |
| EP | 1061487 | 12/2000 |

(Continued)

OTHER PUBLICATIONS

Higgins et al. Pulse-Based 2D Motion Sensors, IEEE Transactions on Circuits and Systems II, vol. 46, No. 6, pp. 677-687, Jun. 1999.*

(Continued)

*Primary Examiner* — Ryan Jarrett
(74) *Attorney, Agent, or Firm* — Kenyon & Kenyon LLP

(57) ABSTRACT

A machine tool device having a monitoring unit for monitoring at least one machine tool monitoring range, the monitoring unit having an evaluation unit. The evaluation unit has a computing unit which is provided to distinguish at least two motions in the machine tool monitoring range.

11 Claims, 4 Drawing Sheets

(56) References Cited

U.S. PATENT DOCUMENTS

| | | | |
|---|---|---|---|
| 7,505,620 B2 | 3/2009 | Braune et al. | |
| 7,792,604 B2* | 9/2010 | Hong et al. | 700/188 |
| 7,920,959 B1* | 4/2011 | Williams | 701/117 |
| 7,924,164 B1* | 4/2011 | Staerzl | 340/573.1 |
| 7,982,772 B2* | 7/2011 | Kaku | 348/208.4 |
| 8,107,089 B2* | 1/2012 | Jokinen | 356/623 |
| 8,165,205 B2* | 4/2012 | Carrig et al. | 375/240.08 |
| 8,171,831 B2* | 5/2012 | Jung et al. | 83/58 |
| 8,315,436 B2* | 11/2012 | Nair | 382/107 |
| 2001/0001840 A1* | 5/2001 | Lichtenstein et al. | 700/121 |
| 2003/0202593 A1* | 10/2003 | Briand et al. | 375/240.16 |
| 2003/0223619 A1* | 12/2003 | Stocker et al. | 382/107 |
| 2005/0207618 A1 | 9/2005 | Wohler | |
| 2005/0232465 A1 | 10/2005 | Braune et al. | |
| 2006/0045354 A1* | 3/2006 | Hanna et al. | 382/224 |
| 2006/0088191 A1* | 4/2006 | Zhang et al. | 382/107 |
| 2006/0101960 A1* | 5/2006 | Smith et al. | 83/58 |
| 2007/0085502 A1* | 4/2007 | Graves | 318/364 |
| 2007/0092111 A1* | 4/2007 | Wittebrood et al. | 382/107 |
| 2008/0065256 A1* | 3/2008 | Davies | 700/165 |
| 2008/0112595 A1* | 5/2008 | Loos | 382/107 |
| 2008/0156989 A1* | 7/2008 | Du et al. | 250/338.1 |
| 2008/0240577 A1* | 10/2008 | Aartsen | 382/218 |
| 2008/0310734 A1* | 12/2008 | Ahammad et al. | 382/209 |
| 2010/0057244 A1* | 3/2010 | Krapf et al. | 700/177 |
| 2011/0035952 A1* | 2/2011 | Roithmeier | 33/503 |

FOREIGN PATENT DOCUMENTS

| | | |
|---|---|---|
| EP | 1 361 543 | 11/2003 |
| EP | 1 586 805 | 10/2005 |
| EP | 1586805 | 10/2005 |
| EP | 1 605 405 | 12/2005 |
| EP | 1 617 376 | 1/2006 |
| WO | WO 99/59116 | 11/1999 |
| WO | WO 2004/039074 | 5/2004 |
| WO | WO 2006/054201 | 5/2006 |
| WO | WO 2007/119183 | 10/2007 |

OTHER PUBLICATIONS

International Search Report, PCT International Patent Application No. PCT/EP2008/064738, dated Feb. 27, 2009.

Artur Ottlik, "On the Model-Supported Initialization of Vehicle Tracking in Video Recording", Infix AKA, 2005, 3 pages with partial English translation.

* cited by examiner

MACHINE TOOL DEVICE HAVING A COMPUTING UNIT ADAPTED TO DISTINGUISH AT LEAST TWO MOTIONS

FIELD OF THE INVENTION

The present invention is directed to a machine tool device.

BACKGROUND INFORMATION

A conventional circular table saw includes a video camera for monitoring a working range. An evaluation unit is also provided which is used to ascertain the velocity of an object moving in the working range on the basis of an image sequence detected by the video camera.

SUMMARY

The present invention is directed to a machine tool device having a monitoring unit for monitoring at least one machine tool monitoring range, the monitoring unit having an evaluation unit.

The evaluation unit has a computing unit which is provided for distinguishing at least two motions in the machine tool monitoring range. High reliability in monitoring the machine tool monitoring range may thus be achieved. In particular, a large number of application situations which may arise during use of a machine tool and which potentially represent a hazard for a user may be recognized. A "motion in the machine tool monitoring range" refers in particular to a motion of an object moving in the machine tool monitoring range which occurs relative to a component of a machine tool, in particular relative to a tool. According to the present invention, the motions of two different objects which at the same point in time move relative to the component in the machine tool monitoring range may be distinguished from one another. It is particularly advantageous that for a workpiece tool machining operation a motion of a workpiece may be distinguished from a motion of another object which advantageously is a body part of a user. The motion of an object may be characterized by the motion of the center of gravity of the object. The monitoring unit preferably has a detection unit for detecting data, the evaluation unit being used in particular for evaluating data detected by the detection unit. The detection unit is designed in particular to detect the machine tool monitoring range. For "detection" of the machine tool monitoring range, the detection unit in particular has a field of vision determined by a lens, the field of vision including at least the machine tool monitoring range or corresponding to the machine tool monitoring range.

The term "provided" is understood in particular to mean "designed," "equipped," and/or "programmed." "Distinguishing" at least two motions refers in particular to distinguishing a first motion parameter, which characterizes a motion of a first object, from a second motion parameter which characterizes a motion of a second object which is different from the first object.

In one preferred embodiment of the present invention, the computing unit determines a comparison variable between motion parameters, each of which characterizes a different motion, thus allowing a simple and quick distinguishing operation to be carried out. The evaluation unit preferably has an evaluation element which is used to evaluate the motion parameters based on the data detected by the detection unit.

In particular, the motion parameters in each case characterize a velocity value. This allows a significant difference in the velocities of two objects to be recognized in a particularly simple manner. Thus, for example, when a workpiece is machined a slippage of a user's hand may be quickly distinguished from a motion of the workpiece. A motion parameter which characterizes a velocity value may be, for example, a variable which is proportional to the actual velocity value.

The motion parameters in each case may also characterize a direction of motion. In this manner a deviation of the motion of an object, in particular a hand of a user, from a safe motion may be effectively recognized. In particular, a deviation of a motion from a preferred working direction in which a workpiece is advanced by the user under normal, safe conditions may be recognized. A motion parameter which characterizes a direction of motion is, for example, a variable which is proportional to an angle or which corresponds to an angle which defines the direction of motion relative to a reference direction such as the working direction, for example.

In a further example embodiment of the present invention, the computing unit determines a motion vector field, thus allowing a particularly high information density to be achieved. A "motion vector field" is understood to mean in particular a collection of points, a vector which characterizes the motion of the point being assigned to each point in the collection. A motion vector field may also be referred to as "motion flow."

The computing unit distinguishes at least two regions of uniform velocity in the motion vector field in at least one operating mode, thus allowing the velocity to be distinguished in a particularly effective manner. A "region of uniform velocity" is understood in particular to mean a contiguous partial range of the motion vector field in which the vectors associated with the points in the partial range are at least substantially identical. A collection of vectors which are "substantially identical" refers in particular to a collection of vectors which is characterized by an average vector length and an average vector direction, the individual vectors with regard to their direction and length deviating from the average direction or length by less than 30%, advantageously by less than 10%, and preferably by less than 5%. A vector direction is preferably defined by an angle relative to a preferred direction of the machine tool, such as relative to a working direction in particular, in which a workpiece is moved toward a tool in a workpiece machining operation.

In a further embodiment variant, the computing unit recognizes the presence of a human body part in the machine tool monitoring range, based on the motion vector field. In this manner a further recognizing element for recognizing a human body part may advantageously be dispensed with. This may be achieved, for example, by ascertaining an extension of a region of uniform velocity and making a comparison in particular to prestored data which characterize the typical extension of human body parts.

In one preferred embodiment of the present invention, the computing unit distinguishes the motions from one another by evaluating optical data, thus allowing a simple and cost-effective design of the machine tool device to be achieved. The term "optical data" refers in particular to data which are obtained with the aid of at least one image recording. It is particularly advantageous to design the detection unit as an imaging unit, such as a video camera in particular, which is provided for recording an image of the machine tool monitoring range. The evaluation unit is advantageously provided for evaluating at least one image recording for the detection unit, using an image processing program. The detection unit is provided in particular for image detection in the visible range. A design of the detection unit for detecting images in an invisible range, for example in an infrared range, is also possible. The evaluation unit in particular has an evaluation means which is provided for determining motion parameters based on an image sequence, detected by the detection unit, having at least two images.

In this regard, two motions in an image sequence may be distinguished in a particularly reliable manner when the computing unit is provided for distinguishing the motions with the aid of an optical flow method. A motion vector field may thus be easily determined using commonly available means. The term "optical flow" refers in particular to a vector field which corresponds to a projection of velocity vectors onto an image plane of an image sequence, and which may be determined by evaluating changes in grayscale values in the image sequence.

The machine tool device preferably has a safety device which is provided for carrying out a safety measure as a function of a signal of the evaluation unit. Such cooperation of the evaluation unit and a safety device allows particularly short response times to be achieved in recognizing a hazardous situation during use of a machine tool. The safety device in particular has at least one actuator unit which is used for carrying out a safety measure relating to a tool, and has a control unit which is provided for activating the actuator unit as a function of a signal of the evaluation unit. The actuator unit may be used to stop a drive of the tool, for example in cooperation with a securing arrangement and/or a drive unit, and/or may be used to move the tool into a range that is inaccessible to a user, and/or may be designed to cover the tool.

In this regard, the computing unit determines a comparison variable between motion parameters, each of which characterizes a different motion, and associates a security level of the safety device with the comparison variable. A safety measure may thus be carried out particularly quickly after a hazardous situation arises. A "security level" refers in particular to an identifier for a given safety mode. In a low security level, a first safety mode may be used to continue driving the tool. At least one second, high security level is advantageously provided which corresponds to a second safety mode in which a safety measure is carried out by the actuator unit and/or the control unit. The security levels may in particular be prestored in a memory unit which is operatively linked to the computing unit.

Moreover, the present invention is directed to a method having a machine tool device which is used to monitor a machine tool monitoring range of a machine tool and in which data are detected.

It is proposed that at least two motions in the machine tool monitoring range are distinguished from one another based on the data. High reliability in monitoring the machine tool monitoring range may thus be achieved. In particular, a large number of application situations which may arise during use of a machine tool and which potentially represent a hazard for a user may be recognized.

In addition, it is proposed that a comparison variable is determined between motion parameters, each of which characterizes a different motion, and that a security level of a safety device via which a safety measure is carried out is associated with the comparison variable. A safety measure may thus be carried out particularly quickly after a hazardous situation arises.

BRIEF DESCRIPTION OF THE DRAWINGS

The figures illustrate exemplary embodiments of the present invention. The figures and descriptions contain numerous features in combination. One skilled in the art will advantageously also consider the features individually and combine them to form further practical combinations.

DETAILED DESCRIPTION OF EXAMPLE EMBODIMENTS

Figure 1:
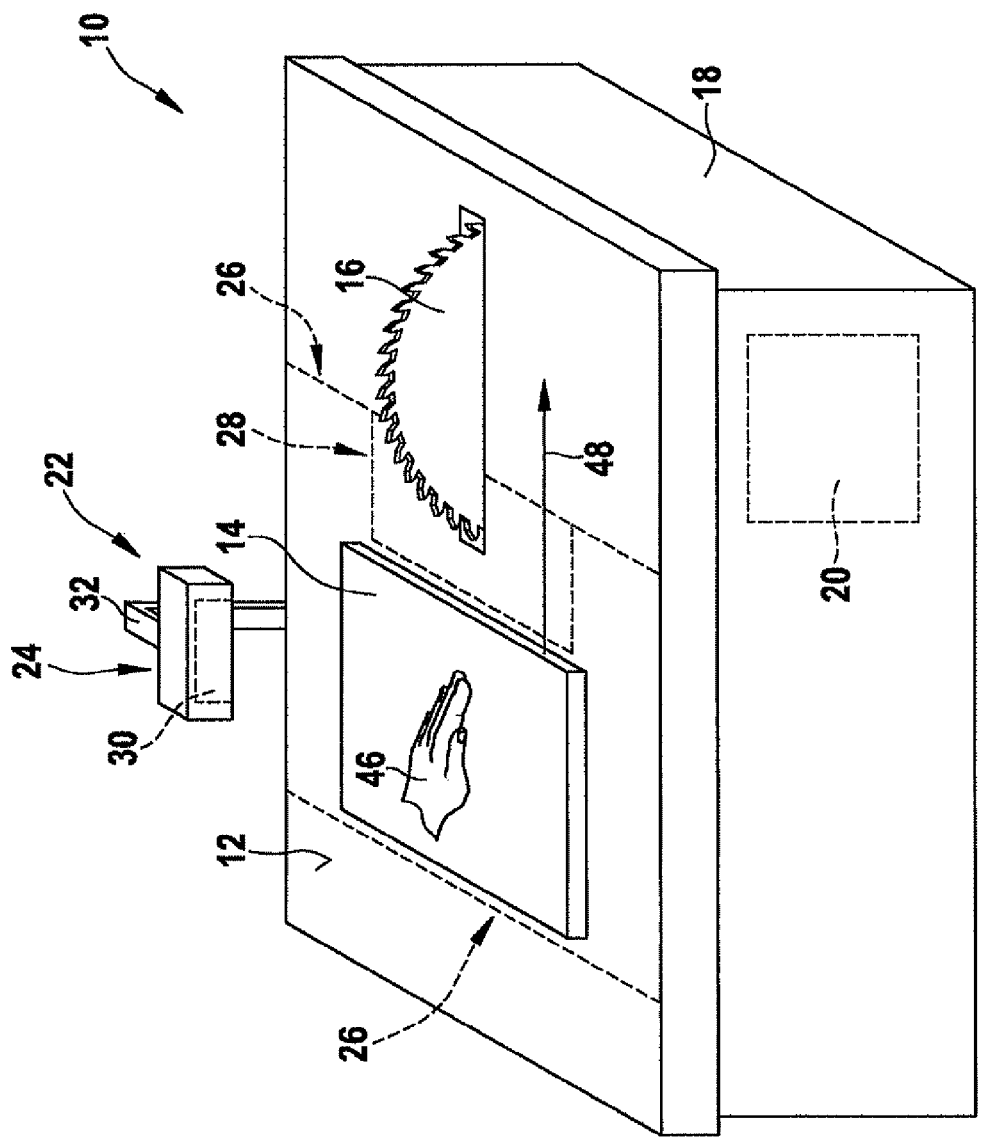
FIG. 1 shows a sawing machine having a work surface, a saw blade, and a monitoring unit.

FIG. 1 shows a machine tool 10 designed as a circular table saw, in a perspective view. The machine tool has a work surface 12 which is designed as a workpiece support surface for laying a workpiece 14 to be machined, and which is horizontally oriented in a base mounting position of machine tool 10. A tool 16 designed as a circular saw blade projects from work surface 12. In a workpiece machining operation, tool 16 is set in rotation by a drive unit 20 which is located in a drive housing 18 situated beneath work surface 12 and which is designed as an electric motor.

Machine tool 10 includes a machine tool device 22 having a monitoring unit 24. This monitoring unit 24 is provided for monitoring a machine tool monitoring range 26. The boundary of machine tool monitoring range 26 on work surface 12 is schematically illustrated by dashed lines in FIG. 1. Machine tool monitoring range 26 contains a partial range of work surface 12, and also extends vertically upward starting from work surface 12. Machine tool monitoring range 26 has a partial range situated in the range of tool 16. This partial range, referred to as hazard range 28, is in the immediate proximity of tool 16. In particular, hazard range 28 directly adjoins tool 16. This hazard range 28 represents a range in which intrusion of a body part of an operator of machine tool 10 is to be avoided. Monitoring unit 24 has a detection unit 30, designed as an imaging unit, which is used to detect machine tool monitoring range 26. For this purpose, detection unit 30 has a field of vision corresponding to machine tool monitoring range 26 to be monitored. In the exemplary embodiment shown, detection unit 30 is situated in a position over work surface 12. Machine tool device 22 has a retaining device 32 which is provided for holding detection unit 30 in this position. Additional configurations of detection unit 30 relative to work surface 12 are possible which are meaningful to one skilled in the art.

Figure 2:
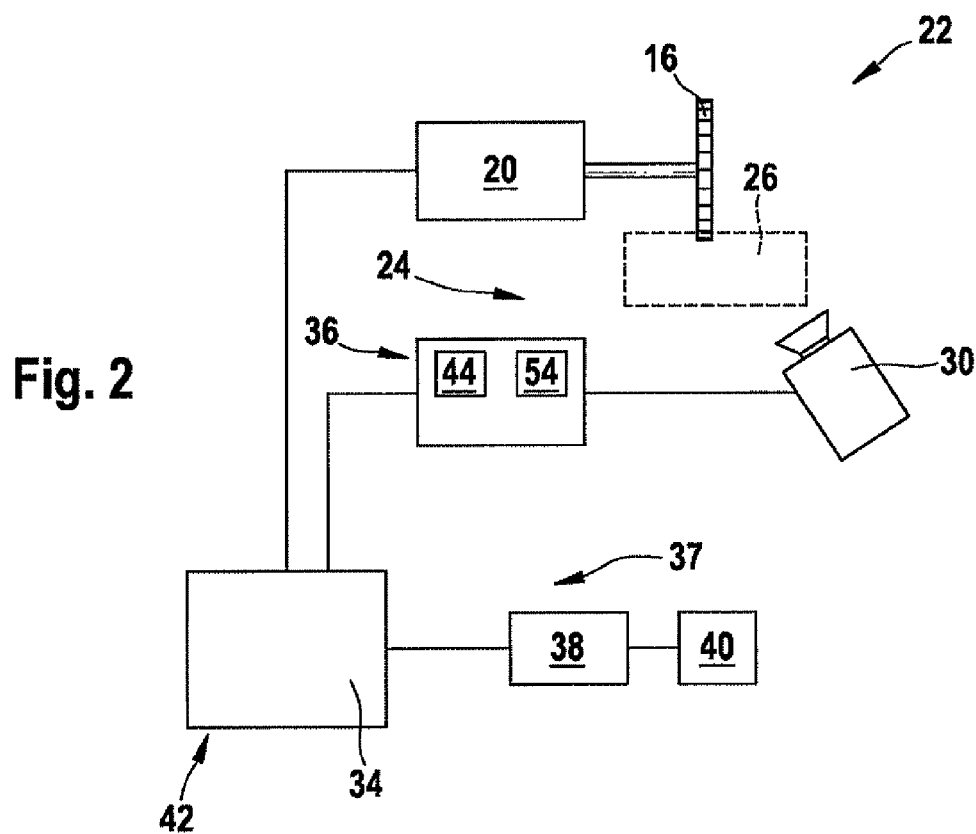
FIG. 2 shows an internal circuit of the sawing machine, having a video camera and an evaluation unit.

FIG. 2 schematically illustrates an internal circuit of machine tool 10. Machine tool device 22 has a control unit 34 which is provided for carrying out operating modes of machine tool 10. Control unit 34 has internal functional elements (not illustrated in greater detail), for example a computing unit, memory unit, etc., which are used for executing operating programs. Control unit 34 is operatively linked to drive unit 20, and is able to transmit control signals to drive unit 20 for controlling and/or regulating a drive of tool 16. In addition to detection unit 30 described above, monitoring unit 24 has an evaluation unit 36 which is operatively linked to detection unit 30 and to control unit 34, and whose function is described in greater detail below. Evaluation unit 36 and control unit 34 together may have at least a partially one-piece design.

Machine tool device 22 also has a safety device 37 which is used to carry out safety measures for an operation of machine tool 10. For this purpose, safety device 37 has an actuator unit 38 which is designed to carry out safety measures which relate to tool 16. According to these safety measures, this tool must be, for example, stopped or moved to a range that is inaccessible to the operator when there is risk of injury to the operator. Actuator unit 38 is used to trigger a securing arrangement 40 operatively linked thereto. In a first alternative, securing arrangement 40 is designed to stop the motion of tool 16 when triggered by actuator unit 38. Securing arrangement 40 is designed as a clamp or brake, for example. In another variant, securing arrangement 40 is designed to lower tool 16 into a range of drive housing 18 beneath work surface 12, which is inaccessible to the operator, when triggered by actuator unit 38. In another embodiment, the securing arrangement may be designed as a cover for covering tool 16. Securing arrangement 40 is triggered by actuator unit 38 when the actuator unit receives an actuating signal of control unit 34. Control unit 34 outputs this actuating signal to actuator unit 38 as a function of a signal of evaluation unit 36. As an alternative or in addition to actuator unit 38, an actuator unit 42 of machine tool device 22 is provided which corresponds to control unit 34. Actuator unit 42, designed as control unit 34, transmits a control signal to drive unit 20 as a function of a signal of evaluation unit 36, thus stopping the drive of tool 16. Thus, a safety measure is carried out by actuator unit 38 and/or 42 as a function of a signal of evaluation unit 36 which triggers activation of actuator unit 38 or 42 by control unit 34. The signal of evaluation unit 36 is transmitted to control unit 34 when a hazard situation is recognized for a drive of tool 16 with the aid of an evaluation operation based on data, in particular image data, detected by detection unit 30. This recognition process is described in greater detail below.

Evaluation unit 36 is provided for taking into account a motion of an object moving in machine tool monitoring range 26 detected by detection unit 30. Evaluation unit 36 carries out an evaluation operation based on a set of data detected by detection unit 30. In this embodiment, detection unit 30 is designed as an imaging unit, in particular a video camera, which is provided for imaging in the visible range. An embodiment of detection unit 30 for detection in an invisible range, for example in an infrared range, is also possible. Evaluation unit 36 carries out an evaluation operation based on an image sequence detected by detection unit 30. According to the present invention, evaluation unit 36 has a computing unit 44 which is provided for distinguishing at least two motions in the machine tool monitoring range. This is explained in greater detail with reference to FIGS. 3a, 3b, 3c, and 4.

Figure 3A:
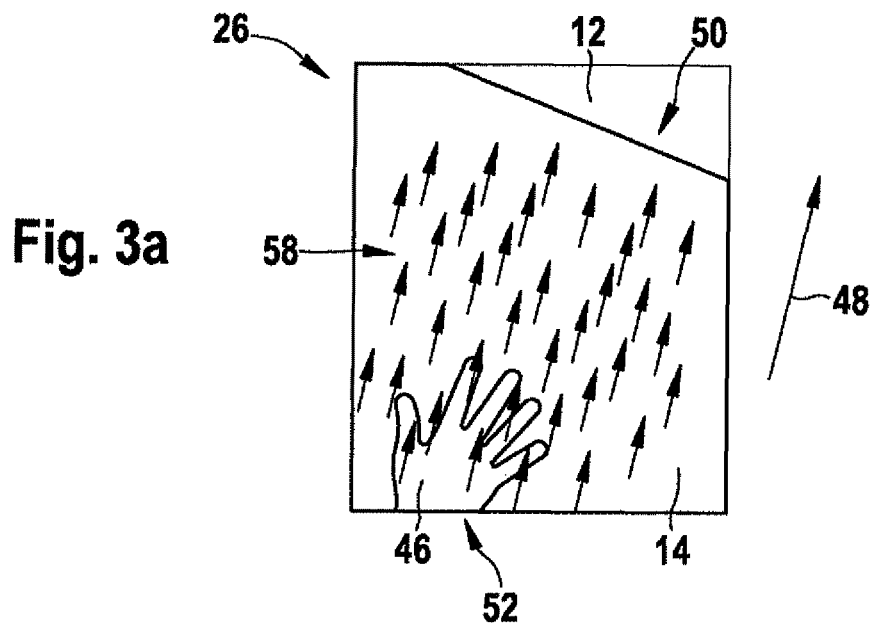
FIG. 3a shows a motion vector field determined by the evaluation unit based on an image sequence of the video camera.
Figure 3B:
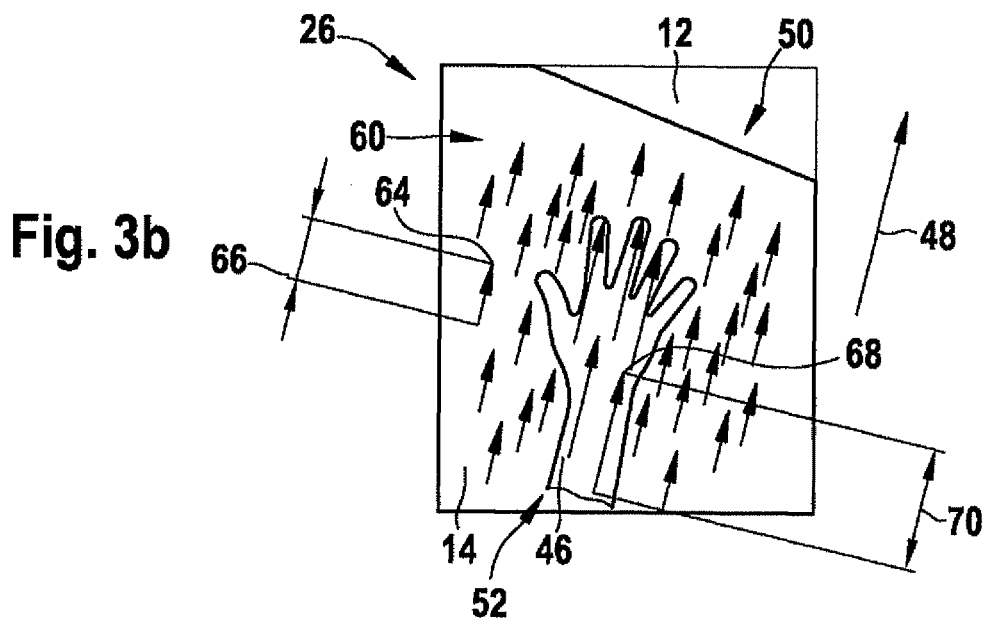
FIG. 3b shows a further motion vector field when a hand of a user slips on a workpiece.

FIGS. 3a and 3b illustrate a partial range of machine tool monitoring range 26 detected by detection unit 30. Work surface 12 on which workpiece 14 is placed is to be recognized. A hand 46 of a user which guides workpiece 14 in a working direction 48 toward tool 16 is supported on workpiece 14 (also see FIG. 1). During a workpiece machining operation, workpiece 14 and hand 46 each undergo a motion in machine tool monitoring range 26 detected by detection unit 30. Workpiece 14 is referred to below as object 50, and hand 46 is referred to as object 52. Computing unit 44 is provided for determining a comparison variable between a first motion parameter, associated with the motion of first object 50, and a second motion parameter associated with the motion of second object 52. Computing unit 44 may have a microprocessor or may be designed as a microprocessor. The computing unit evaluates an image sequence of detection unit 30 with the aid of a program, in particular an image processing program, stored in a memory unit 54 of evaluation unit 36.

Figure 4:
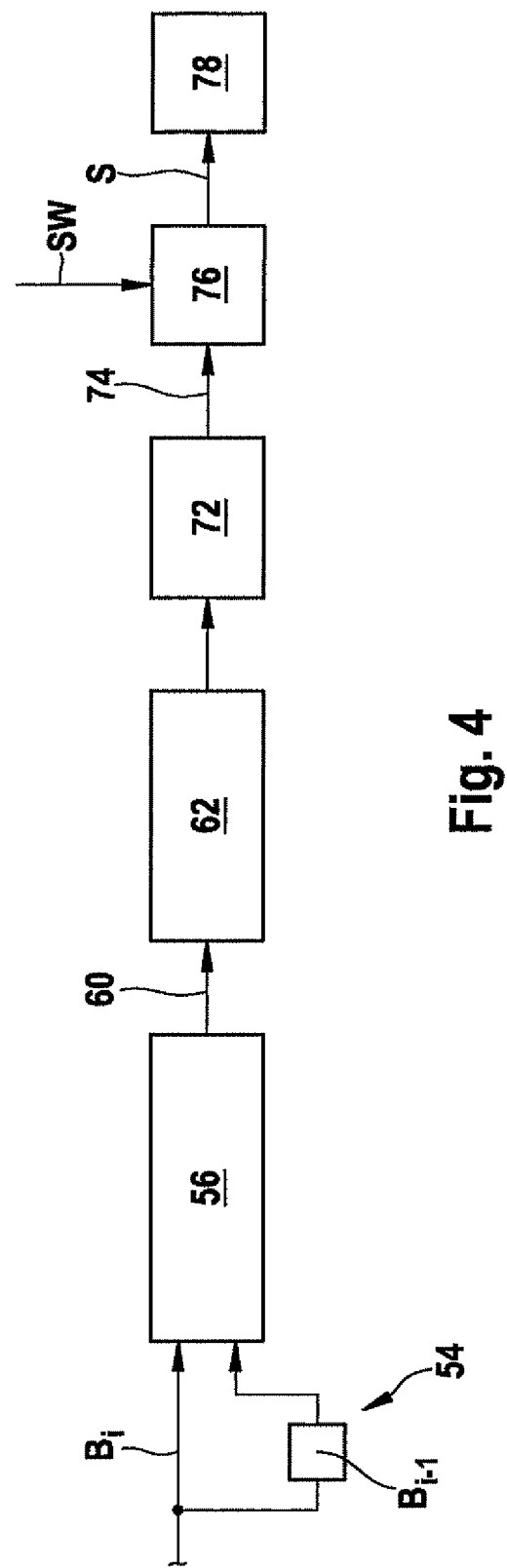
FIG. 4 shows an evaluation method for the evaluation unit.

The sequence of the evaluation process carried out by evaluation unit 36 is illustrated in a flow chart in FIG. 4. At a point in time $t_{i-1}$, detection unit 30 detects an image in machine tool monitoring range 26. This image $B_{i-1}$ is stored, for example in memory unit 54. At a later point in time $t_i$ a further image $B_i$ in machine tool monitoring range 26 is detected. The data of images $B_{i-1}$, and $B_i$ are evaluated by computing unit 44 in an evaluation step 56 with the aid of the image processing program. In particular, the motion of individual points in machine tool monitoring range 26 is analyzed via a comparison of $B_i$ and $B_{i-1}$, and a motion vector field is thus determined by computing unit 44. The image processing program uses an optical flow method. In image sequence $B_{i-1}$, $B_i$ the motion of pixel regions having constant brightness in this image sequence is analyzed. By comparing the positions of a pixel region in images $B_{i-1}$ and $B_i$ a motion vector is associated with this pixel region. A motion vector characterizes the direction and magnitude of the motion of the pixel region. The association of a motion vector with each of the pixel regions results in a motion vector field 58 or 60, illustrated in FIGS. 3a and 3b, respectively. As an alternative or in addition to the optical flow method, motion vectors may be associated with pixel regions which are characterized by a color feature, a texture feature, a given pattern, etc.

Motion vector field 58 or 60 is segmented in a subsequent evaluation step 62. Regions of motion vector field 58 or 60 which are characterized by a uniform velocity are ascertained. In the situation illustrated in FIG. 3a, in which the operator pushes workpiece 14 along work surface 12 in working direction 48, object 50 and object 52 have generally the same velocity, in particular with regard to both the direction, which corresponds to working direction 48, and the magnitude. In the segmentation step, computing unit 44 recognizes that in image sequence $B_{i-1}$, $B_i$ the entire image range with which motion vector field 58 has been associated has a uniform velocity. In the situation shown in FIG. 3b it is assumed that hand 46 slips while pushing workpiece 14 in the direction of tool 16. Motion vector field 60, which is determined in this situation in evaluation step 56 based on images $B_{i-1}$ and $B_i$, is illustrated in FIG. 3b. In evaluation step 62, due to the segmentation of motion vector field 60 two regions are recognized, each of which is characterized by a uniform velocity. A first region corresponds to object 50, i.e., workpiece 14, while a second region corresponds to object 52, i.e., slipping hand 46. The first region is characterized by two motion parameters 64, 66 which correspond to the direction or the length of the motion vector which is uniformly associated with the region. Motion parameters 64, 66 are two velocity parameters. Motion parameter 64 characterizes the direction of the velocity, while motion parameter 66 is proportional to the velocity value. Motion parameter 64 corresponds in particular to an angle (not further illustrated for clarity) which defines the vector direction relative to working direction 48. The second region is accordingly characterized by two motion parameters 68, 70. As a result of the segmentation of motion vector field 60 in evaluation step 62, the extension of a region of uniform velocity is also ascertained. This extension is compared to prestored data in memory unit 54 which characterize the characteristic extension of typical objects which may potentially move in machine tool monitoring range 26, such as the characteristic extension of a hand, for example. Thus, objects 50, 52 may be recognized as workpiece 14 on the one hand and as a human body part, in particular hand 46, on the other hand. Evaluation step 62 of computing unit 44 thus allows the presence of a human body part in machine tool monitoring range 26 to be recognized on the basis of motion vector field 60. This evaluation step 62 is optional. In one embodiment variant, a human body part may be recognized in an evaluation step of the image processing program based on a color feature, texture feature, and/or contour feature. In another embodiment variant it is possible for monitoring unit 24 to have, in addition to detection unit 30, a sensor arrangement which is used for recognizing a material, in particular for recognizing human tissue. For example, the sensor arrangement may be designed as an infrared sensor or radar sensor. Thus, in cooperation with detection unit 30 various materials may be associated with various ranges of detected machine tool monitoring range 26. In this embodiment variant the motion of recognized hand 46 may be characterized solely by a motion vector associated with the hand in evaluation step 56, without having to ascertain regions of uniform velocity.

Figure 3C:
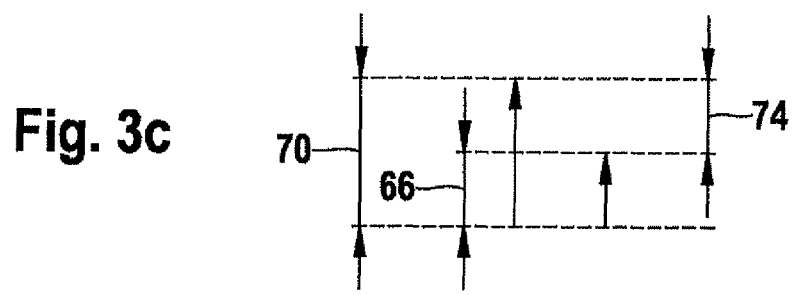
FIG. 3c shows the determination of a comparison variable for distinguishing between the motion of the hand and the motion of the workpiece in the situation illustrated in FIG. 3b.

In a further evaluation step 72, computing unit 44 evaluates a comparison variable between motion parameters 64 and 68, or a comparison variable between motion parameters 66 and 70. Using a comparison variable, computing unit 44 may, if necessary, recognize a difference between the directions of motion of objects 50, 52. For example, the comparison variable may be an angle magnitude which characterizes an angle defined by the corresponding motion vectors. In the present situation in FIG. 3b, these directions of motion are substantially identical. From this information, computing unit 44 is able to recognize that object 52, i.e., hand 46, is moving in the direction of tool 16. By comparing motion parameters 66, 70, computing unit 44 determines a comparison variable 74, on the basis of which different velocity values of objects 50, 52 may be recognized if necessary. This comparison variable 74 may correspond, for example, to a difference in length of the motion vectors which characterize the motions of objects 50, 52. This is illustrated in FIG. 3c.

In a further evaluation step 76, computing unit 44 evaluates the comparison variables, in particular comparison variable 74, determined based on the motion parameters. In the situation in FIG. 3b, a high security level S of safety device 37 is associated with exceeding a predetermined threshold value SW by comparison variable 74. According to this security level S, in a step 78 evaluation unit 36 transmits a signal to control unit 34, which as described above initiates safety measures for actuator unit 38 and/or 42. Preset threshold value SW is prestored in memory unit 54, for example.

In the situation illustrated in FIG. 3a, computing unit 44 associates a low security level of safety device 37 with the fact of a uniform velocity of the entire detected partial range of machine tool monitoring range 26. According to this security level, tool 16 continues to be driven.

Machine tool device 22 is also suited for other types of machine tools, for example compound miter saws, miter saws, band saws, etc.

What is claimed is:

1. A machine tool device, comprising:
a monitoring unit for monitoring at least one machine tool monitoring range, the monitoring unit having an evaluation unit, the evaluation unit having a computing unit adapted to determine a motion vector field and to distinguish at least two motions in the machine tool monitoring range;
wherein the computing unit is adapted to:
determine a comparison variable between motion parameters of the at least two motions, each of which characterizes a different motion; and
detect the presence of a human body part in the machine tool monitoring range based on the motion vector field by ascertaining an extension of a region of uniform velocity and comparing the extension to prestored data corresponding to an extension of the human body part.

2. The machine tool device as recited in claim 1, wherein the motion parameters in each case characterize a velocity value.

3. The machine tool device as recited in claim 1, wherein the motion parameters in each case characterize a direction of motion.

4. The machine tool device as recited in claim 1, wherein the computing unit is adapted to distinguish at least two regions of uniform velocity in at least one operating mode in the motion vector field.

5. The machine tool device as recited in claim 1, wherein the computing unit is adapted to distinguish the motions from one another by evaluating optical data.

6. The machine tool device as recited in claim 5, wherein the computing unit is adapted to distinguish the motions with the aid of an optical flow method.

7. The machine tool device as recited in claim 1, further comprising:
a safety device to carry out a safety measure as a function of a signal of the evaluation unit.

8. The machine tool device as recited in claim 7, wherein the computing unit is adapted to associate a security level of the safety device with the comparison variable.

9. A machine tool, comprising:
a tool; and
a machine tool device, including a monitoring unit for monitoring at least one machine tool monitoring range associated with the tool, the monitoring unit having an evaluation unit, the evaluation unit having a computing unit adapted to determine a motion vector field and to distinguish at least two motions in the machine tool monitoring range;
wherein the computing unit is adapted to:
determine a comparison variable between motion parameters of the at least two motions, each of which characterizes a different motion; and
detect the presence of a human body part in the machine tool monitoring range based on the motion vector field by ascertaining an extension of a region of uniform velocity and comparing the extension to prestored data corresponding to an extension of the human body part.

10. A method for monitoring a machine tool device, comprising:
monitoring a machine tool monitoring range of a machine tool;
detecting data in the machine tool monitoring range;
determining a motion vector field;
distinguishing at least two motions in the machine tool monitoring range from one another based on the data; and
determining a comparison variable between motion parameters of the at least two motions, each of which characterizes a different motion
detecting the presence of a human body part in the machine tool monitoring range based on the motion vector field by ascertaining an extension of a region of uniform velocity and comparing the extension to prestored data corresponding to an extension of the human body part.

11. The method as recited claim 10, further comprising:
associating a security level of a safety device via which a safety measure is carried out with the comparison variable.

* * * * *